United States Patent [19]

Glassmeyer

[11] 4,131,071
[45] Dec. 26, 1978

[54] CARGO TRANSPORTATION DEVICE

[75] Inventor: John J. Glassmeyer, Covington, Ky.

[73] Assignee: Pullman Incorporated, Chicago, Ill.

[21] Appl. No.: 756,023

[22] Filed: Dec. 27, 1976

Related U.S. Application Data

[63] Continuation of Ser. No. 590,902, Jun. 27, 1975, abandoned.

[51] Int. Cl.² .............................................. B65D 19/12
[52] U.S. Cl. .............................. 108/53.1; 105/366 A; 105/366 C; 108/56.1
[58] Field of Search .............................. 108, 53.1, 53.3, 108/53.5, 55.1, 56.1, 19; 220/1.5, 23.4; 214/10.5 R, 38 CA, 38 D; 294/67 B; 211/195; 105/366 R, 366 A, 366 C, 366 D, 463, 464, 465; 280/145; 248/346

[56] References Cited

U.S. PATENT DOCUMENTS

| | | | |
|---|---|---|---|
| 2,956,763 | 10/1960 | D'Arca | 108/53.1 |
| 2,998,141 | 8/1961 | Moore et al. | 108/53.3 |
| 3,159,111 | 12/1964 | Gutridge et al. | 105/366 R |
| 3,480,174 | 11/1969 | Sherwood | 108/55.1 |
| 3,529,741 | 9/1970 | Walker et al. | 220/1.5 X |
| 3,545,713 | 12/1970 | Mowatt-Larssen | 105/366 C |
| 3,568,608 | 3/1971 | Taylor | 108/53.1 |
| 3,648,909 | 3/1972 | Wisecarver | 214/10.5 R X |
| 3,664,273 | 5/1972 | Howe | 108/53.1 |
| 3,735,713 | 5/1973 | Glassmeyer | 108/53.5 |

Primary Examiner—Roy D. Frazier
Assistant Examiner—William E. Lyddane
Attorney, Agent, or Firm—Thomas G. Anderson

[57] ABSTRACT

A cargo transporting device comprises a flat deck container having at opposite ends upwardly extending partial walls cooperating with hinged bulkheads which in an upright position provide continuous vertical walls at the ends of the platform. The hinged bulkheads are movable to stored positions on the deck of the device wherein the low height walls provide supports for stacking a plurality of the same type of container or device. The deck or platform of the containers are provided with a plurality of twist lock assemblies which are movable from operative positions locking containers on the platform to stored positions below the deck.

3 Claims, 5 Drawing Figures

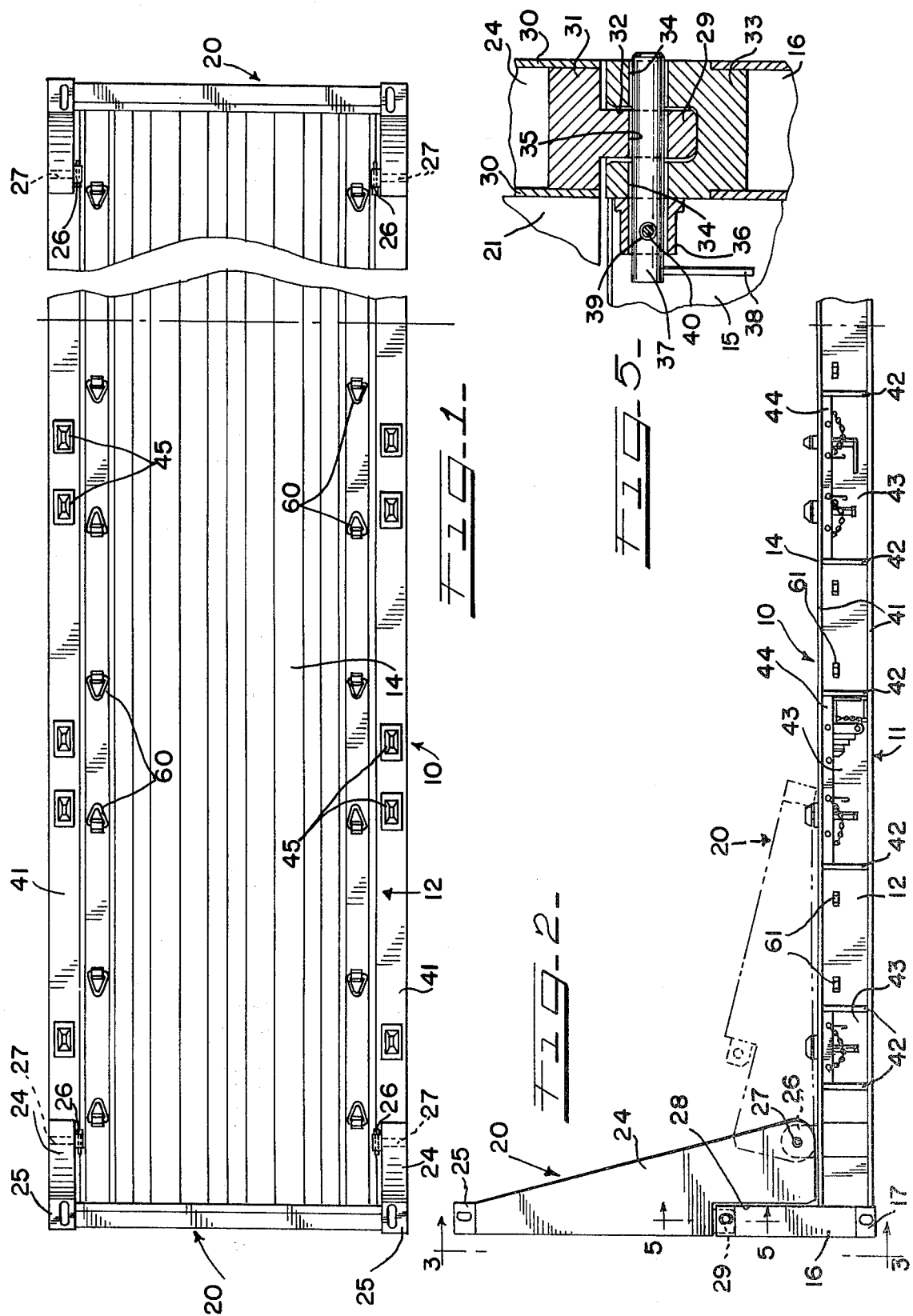

CARGO TRANSPORTATION DEVICE

This is a continuation, of Ser. No. 590,902, filed June 27, 1975 now abandoned.

BACKGROUND OF THE INVENTION (1) Field of the Invention

The present invention relates to cargo transporting devices or containers of the flat deck type adapted to carry cargo thereon, the said devices being movable by material handling trucks or trains, etc. into the holds of cargo ships or onto other shipping vehicles.

(2) Description of the Prior Art

The prior art is exemplified in U.S. Pat. No. 3,735,713 patented May 29, 1973 and in the references cited therein. The present invention is an improvement over such transportation devices in that it provides for hinged bulkheads which are movable to stored position with bulkhead portions or supports remaining to accomodate stacking of similar devices on top of one another.

SUMMARY OF THE INVENTION

The present invention pertains to a flat deck container or cargo transporting device which includes at opposite ends thereof low height vertical stationary wall portions having end support posts which form portions of a bulkhead one of which is disposed at opposite ends of each of the deck or platform of the container. The low height walls permit and facilitate the stacking of similar devices when they are shipped or stored in non-cargo carrying positions. Each of the devices also includes hinged bulkheads which are movable from a stored horizontal position on the deck of the device vertically into locking engagement with the low height supports or bulkheads to form a continuous end wall on each end of the device and thereby forming a vertical continuous end wall or bulkhead at opposite ends of the platform. The hinged bulkheads are locked in position by sliding bolt means which is accessible on opposite ends on each of the bulkheads by the operator to facilitate locking and unlocking of the hinged bulkheads in the vertical positions.

The deck or platform of the container also includes on horizontally opposite sides longitudinally extending channel shaped members which provide a plurality of bays within which hinged twist lock assemblies are stored in an out of the way position and yet readily accessible from the sides of the container. The twist lock assemblies may be quickly locked in operative positions projecting then upwardly through the decks for engagement with a multiplicity of containers that are desired to be carried on the deck of the transporting device.

BRIEF DESCRIPTION OF THE DRAWINGS

FIG. 1 is a plan view of an improved cargo transporting device;

FIG. 2 is an enlarged side elevational view of one end of the transportation device shown in FIG. 1;

FIG. 5 is an enlarged cross-sectional view of a locking device taken substantially along the line 5—5 of FIG. 2.

DESCRIPTION OF THE PREFERRED EMBODIMENT

Figure 3:
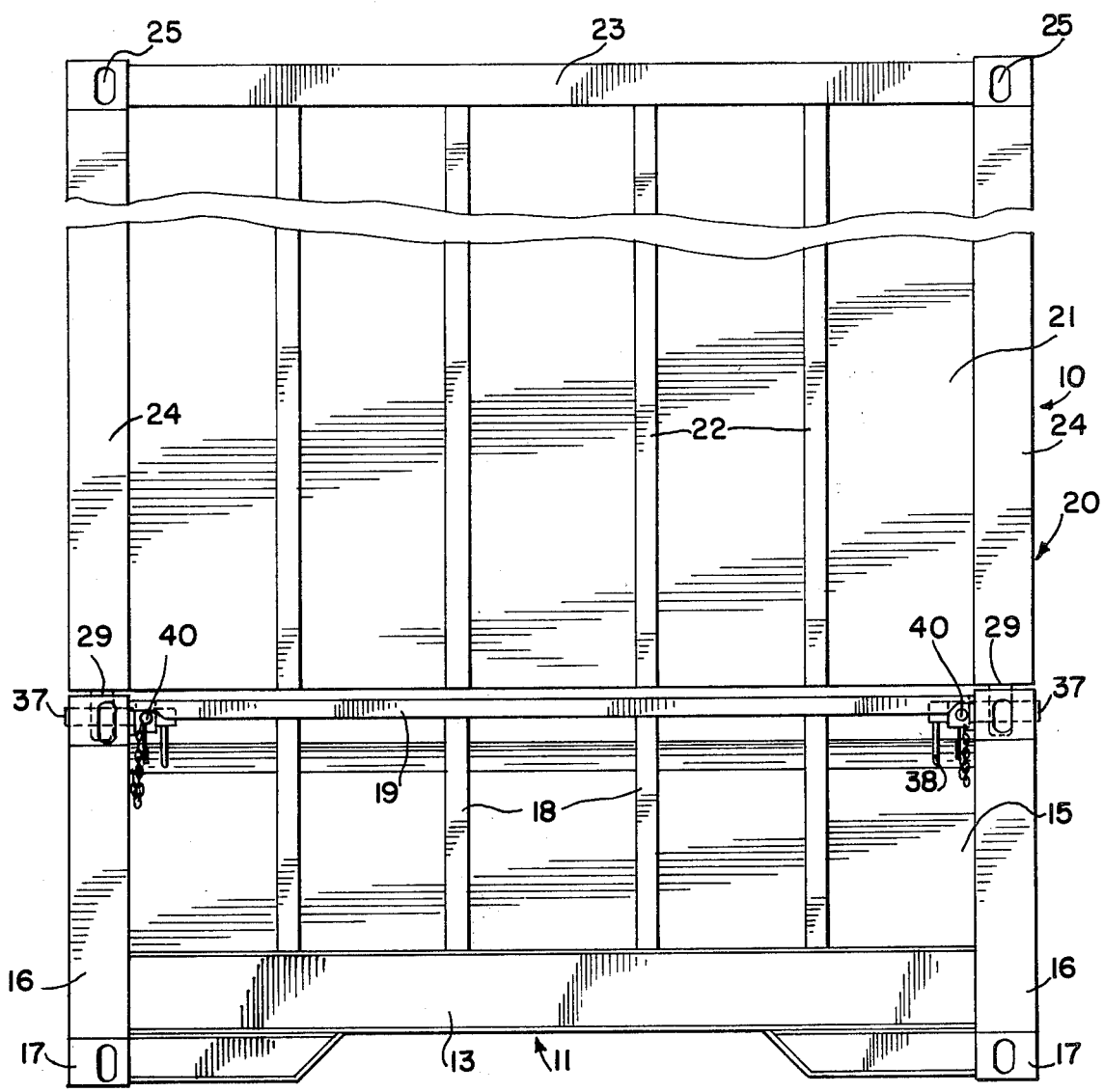
FIG. 3 is an enlarged end view taken substantially along the lines 3—3 of FIG. 2.

Referring particularly to FIG. 1, a device for transporting cargo is designated by the reference character 10 and includes a horizontal frame 11 provided at laterally spaced sides with longitudinally extending channels or frame members 12. As best shown in FIG. 3, the device 10 also includes transverse channels 13 provided at opposite ends of the frame 11. The device 10 also includes a platform or deck 14 on which cargo is to be carried. Upright support walls 15 of substantially low height are also provided at opposite ends of the device 10 and include the transverse channel shaped frame members 13. The upright support walls 15 include vertical corner posts 16 provided at their lower ends with corner casting 17 of conventional construction. Castings of this type are universally used with cargo containers and may be secured to similar containers by the said corner castings or the corner castings may be utilized for engagement with the slings of cranes and other hoisting devices for transporting the containers between various shipping mediums. The upright support walls 15 also include vertical reinforcing ribs 18 and an upper horizontal rib 19. As best shown in FIGS. 1-3 a bulkhead 20 is provided at each end of the platform 40 and includes a bulkhead wall 21 also constructed with reinforcing vertical ribs 22 and an upper horizontally extending rib 23. Each of the bulkheads 20 also includes an upright post 24 connected to the bulkhead wall in U-shaped configuration. The post 24, as best shown in FIG. 2, is comparatively narrow at the top and slopes diagonally to be substantially wide at the bottom when viewed from the side as shown in FIG. 2. The upper ends of the bulkhead wall 21 and post 24 also are joined at their upper ends by conventional corner castings 25. As best shown in FIGS. 1 and 2, the deck 14 is provided with upwardly projecting hinge brackets 26 which by means of hinge pins 27 hingedly connect the posts 24 so that the entire bulkhead 20 may be moved into the horizontal stored position shown in dotted lines in FIG. 2. The posts 24 are also provided with a vertical recess or cutout 28, shown in FIG. 2 which provides a space for the vertical corner post 16 thereby in the vertical position of the posts 24 providing a substantially flush and continuous bulkhead wall at opposite ends of the device. In order to secure or lock the bulkheads 20 in the upright position shown in FIGS. 1 and 2, there are provided keeper projections 29, as best shown in FIG. 5, which extend downwardly from the bottom ends of the bulkhead 20. As indicated, the post 24 is provided with vertical space plates 30 suitably connected to lateral ends of the bulkhead walls 21 and are provided with lower blocks 31 secured within the plates 30 and from which the keeper projections 29 extend downwardly. A recess or socket 32 is provided in the upper surface of blocks 33, which also may be corner castings, supported in the upper ends of the corner post 16. Transverse bores 34 in the blocks 33 are in registry with a bore 35 provided in the keeper projection 29 as shown in FIG. 5. A sleeve or bearing 36 is suitably connected to the block 33 and a slide bolt 37 extends there through, through the bores 34 and 35 for locking the bulkhead 20 in the operative position shown in FIGS. 1 and 2. The slide bolt 37 includes a handle 38 readily accessible from the rear of the cargo transportation device as shown in FIG. 3. The slide bolt 37 also includes a transverse bore 39 which is adapted to register with openings (not shown) provided in the sleeve 36 for receiving a lock pin 40 to securely lock the slide bolt 37 in its locked position shown in FIG. 5.

Figure 4:
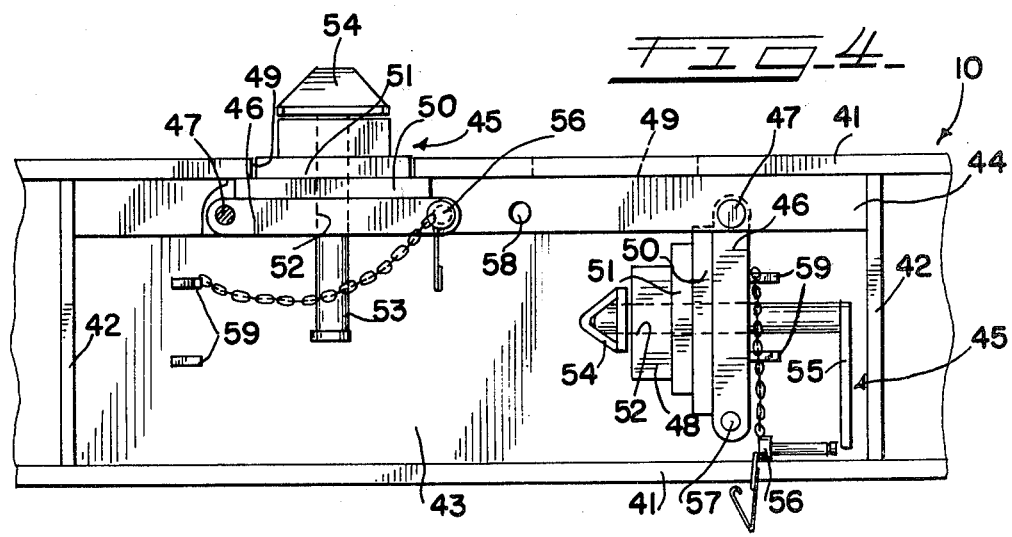
FIG. 4 is an enlarged side elevational view of a pair of twist lock assemblies, one being in operative position and the other being stored within a bay of a side structural channel member of the device.

As best shown in FIGS. 1, 2 and 4, the frame 11 also is provided with the logitudinal channels 12 which include outwardly projecting flanges 41 partitioned by means of suitable vertical partition walls 42 to provide a plurality of storage space generally designated at 43. Each of the storage bays 43 also are provided at their upper ends with downwardly projecting and longitudinally extending plates 44 suitably connected to the flanges 41 and the vertical partitions 42. Referring now particularly to FIGS. 4 and 5, the platform is provided with a plurality of twist lock assemblies generally designated at 45. Each of the twist lock assemblies 45 includes a base plate 46 which by means of a hinge pin 47 suitably supported on the plates 44 and the channel 12 hingedly connects the base plate as indicated in FIG. 4. Each base plate 46 also is connected to an integral shear block structure 48 which is adapted to be moved through openings 49 provided in the upper flanges 41 so as to place the twist lock assemblies in operative position. Each of the shear block structures 48 also includes a plate forming a stop as indicated at FIG. 4 underneath the opening 49 in its engagement with the lower edge of the flange 41. The shear block structure further includes a face plate 51 which is adapted to be disposed within the opening 49 in the operative position of the twist lock as shown in FIG. 4. The base plate 46 and the shear block structure 48 is provided with a continuous bore 52 within which a cylindrical shaft 53 is disposed for rotation and being provided at its upper end with a conventional locking cone 54. The locking cone 54 and shear block structure are adapted to engage conventional corner castings of containers for securely locking the container on the platform when the shaft 53 is turned by the operator thus providing for inter-engagement of the cone with the corner castings of the container. The cylindrical shaft 53 is provided at its lower end with a handle 55 for achieving this purpose. As shown in FIG. 4, the left hand twist lock is in operative position projecting upwardly above the deck with the base plate 46 securely locked in this position by means of a locking pin 56 which engages an opening 58 in the plate 44 and may suitably also engage a similar opening (not shown) in the web of the channels provided in the area of the storage bays 43. The storage bays also are provided with outwardly extending tabs or stops 59 which as shown in FIG. 4 in the stored position of one of the twist locks maintains the base in a vertical position so that the assembly is stored within the bay 43 below the platform.

THE OPERATION

In FIGS. 1 and 2, the transportation device is in position ready for loading and for shipment. In this particular case certain of the twist locks are disposed to project upwardly through the deck so that they may engage containers which are desired to be shipped on the unit. The bulkheads 20 are securely locked and upon loading the device is ready for transporting the cargo to its point of destination. After it has reached its destination and it is desired to return the empty device or devices to their point of origin or other destination the bulkheads 20 are released from the locked position shown in FIG. 5 and are hinged to the dotted line position substantially horizontal and laying upon the deck of the device. Other similar devices then may be stacked one on top of the other such stacking being provided by the corner post 16 and lower support walls 15 whereupon a multiplicity of devices may thus be expeditiously stacked for such non-cargo carrying shipment.

The twist lock assemblies may be all or partially disposed within the base as indicated by merely hinging them to their stored position by withdrawing the locking pins 56 where by gravity they assume the vertical position shown in FIG. 4 against the stop or tabs 59. The device also includes tie down lugs 60 and strapping brackets 61 which are utilized for further supporting various type of cargoes on the deck of the unit. It is particularly of advantage in that the twist locks are movable from use to non-use positions and are readily accessible to the operator being disposed in recessed bays on the sides of the channel shaped frame members 12. In this manner they are out of the way, are readily accessible and are protected during non-use when in the stored position. Also, the split type of bulkhead structure afforded by the walls 15 and bulkhead 20 permit a continuous strong vertical bulkhead at the opposite ends of the device which may readily be moved to a position wherein a portion of the bulkhead lies in a non-use position on the deck and the remainder of the bulkhead is utilized for stacking as described above.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

I claim:

1. A generally rectangular stackable cargo transportation device having a frame and a cargo platform thereupon, upright support members at longitudinally opposite ends of the platform and extending thereabove, an end bulkhead movable between a vertical raised position and a generally horizontal position associated and cooperative with each end support member to form a vertically extending cargo retaining end wall in the raised position and being stowable in the horizontal position, each of said bulkheads including a transverse end wall portion and transversely spaced vertical posts having portions in alignment therewith and other portions widthwise of the end wall extending inwardly therefrom, each of said other portions comprising a post having generally triangular vertical side plates and said plates having horizontal lower edge portions opposing the platform and being recessed and having portions above the recessed area in the plane of the end wall adapted to overlie and longitudinally abut the associated upright support member when the bulkhead is moved to the raised position to arrest outward rotation of the bulkhead therebeyond, hinge means spaced longitudinally inward from each upright support member pivotally coupling the posts associated therewith at said plates to the cargo platform immediately above the top of the platform, releasable interengaging latch means on said posts and the upper ends of the upright support members spaced above said platform and positioned in alignment with the related end wall and operative to directly oppose loads upon said end walls, said latch means including a vertical recess in its associated upright support member, a first transverse bore extending through said support member communicating with the recess, slide bolt means movable in said first bore through the recess, a keeper lug on each post receivable in the associated recess to assure vertical alignment of the bulkhead above the respective upright support and to arrest relative lateral movement therebetween, and said lug including a second transverse bore registering with said first bore and releasably engagable by said slide bolt means in locking relation.

2. The invention according to claim 1, and said releasable latch means including an upper block portion in said upright support member, said vertical recess being an upwardly opening vertical slot in said block, said first transverse bore extending through said block and communicating with said slot, and said keeper lug being receivable in said slot and being sandwiched within said block when the bulkhead is moved to the raised position, thereby forming a clevis-like connection between said lug, block and slide bolt essentially elimintaing obstructive lateral bending of the bolt.

3. The invention according to claim 1, and said frame having longitudinal beams in alignment with respective posts and cargo latching means mounted on the beams stowable below the top edges of respective beams to accommodate folding of said posts over associated beams in flat edge seating position thereon.

* * * * *